June 30, 1931. E. E. WALKER 1,812,227
WHEEL
Original Filed Nov. 26, 1926
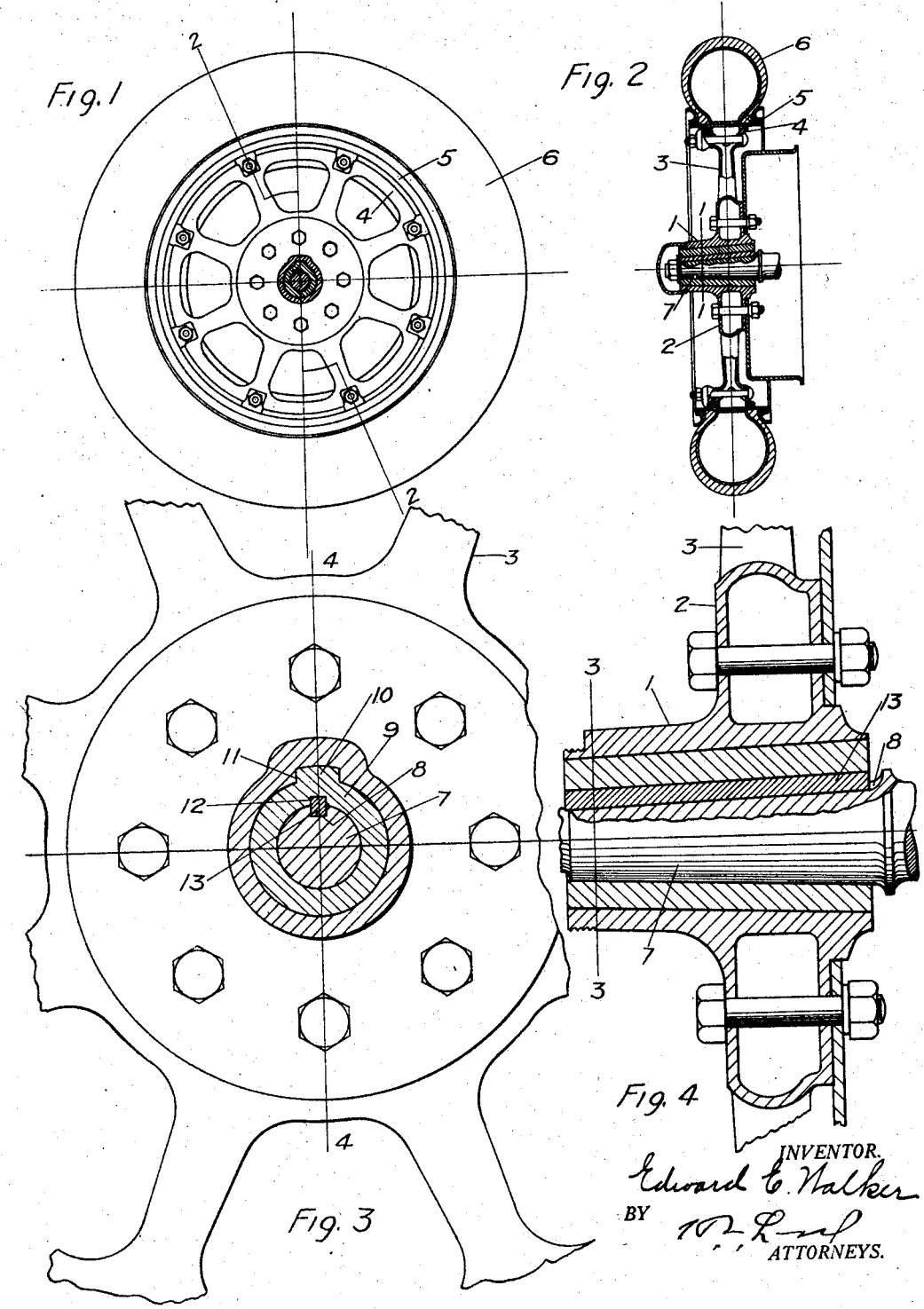
INVENTOR.
Edward E. Walker
BY
ATTORNEYS.

Patented June 30, 1931

1,812,227

UNITED STATES PATENT OFFICE

EDWARD E. WALKER, OF ERIE, PENNSYLVANIA, ASSIGNOR TO ERIE MALLEABLE IRON COMPANY, OF ERIE, PENNSYLVANIA, A CORPORATION OF PENNSYLVANIA

WHEEL

Application filed November 26, 1926, Serial No. 150,781. Renewed June 18, 1929.

In the forming of metal wheels, certain metal such as malleable iron is very much more desirable in forming the hub than a relatively hard metal, such as cast steel. There are several reasons for this. Malleable iron lends itself more readily to thin walled nicely formed castings and also can be more readily worked and machined after its formation. Thus it is practical to make a lighter wheel of such material and more cheaply than when formed of cast steel. The difficulty in using malleable metal for hubs of driving wheels is that the walls of an ordinary key-way with which said hubs are provided are not sufficiently strong, or dense, to sustain the driving strains and shocks to which these walls are subjected. In consequence, it has been common to form wheels using malleable castings for the frame, or wheel structure outside of the hub and cast steel for the hub.

The present invention is directed to a means by which hubs of relatively soft metal, such as malleable iron, may be successfully used and it consists broadly in supplying such hub with a metal insert of relatively hard metal, such as steel and preferably steel that may be hardened for the keyway.

It is desirable that the insert be such that it may be secured in the hub without distorting the same, be so formed that it will be rigidly secured in the hub and in such manner that the driving strains may be readily communicated through the malleable iron without injury. The present invention accomplishes this purpose in a simple and effective manner. Features and details of the invention will appear from the specification and claims.

The invention is illustrated in the accompanying drawings as follows:—

Fig. 1 shows a side elevation of a wheel, partly in section, on the line 1—1 in Fig. 2.

Fig. 2 a section on the line 2—2 in Fig. 1.

Fig. 3 an enlarged view of the hub, partly in section on the line 3—3 in Fig. 4.

Fig. 4 a section on the line 4—4 in Fig. 3.

1 marks the hub, 2 the hub flange, and 3 the spokes extending from the hub flange. The spokes in the exemplification shown are provided with the felloe 4. A demountable rim 5 is arranged on the felloe and a tire 6 is carried by this rim.

An axle 7 is provided with a key-way 8. A bushing 9 is forced into the opening in the hub, this opening being preferably slightly tapered. The bushing has a key projection 10 which forms a nice fit with a key-way 11 formed in the hub so that when the bushing is forced to place it is locked against turning and held rigidly and secured in the hub.

In this way not only is it possible to get a much closer and secure fit between the bushing and the hub but also a larger locking surface in the key-way so that the soft metal of the hub will readily sustain the thrust and strain from the axle.

The bushing is provided with a key-way 12 corresponding to the key-way 8 and the usual key 13 is arranged in these key-ways locking the hub as a whole with the axle.

What I claim as new is:—

1. In a wheel, the combination of a metal wheel hub formed of relatively soft metal having an axle opening therein; and a relatively hard metal bushing secured in the opening, said bushing having key shoulders on its inner periphery.

2. In a wheel, the combination of a metal wheel hub formed of relatively soft metal having an axle opening therein, and a relatively hard metal bushing in the opening, said bushing having key shoulders on its inner periphery and a key lock between it and the hub.

In testimony whereof I have hereunto set my hand.

EDWARD E. WALKER.